United States Patent

[11] 3,626,384

[72] Inventors Jonathan B. Davis
 Mahopac, N.Y.;
 Nathen P. Edwards, Darien, Conn.; Harold
 H. Herd, Ossining, N.Y.
[21] Appl. No. 887,703
[22] Filed Dec. 23, 1969
[45] Patented Dec. 7, 1971
[73] Assignee International Business Machines
 Corporation
 Armonk, N.Y.

[54] METHOD FOR REPRESENTING MEASURED DATA VALUES BY COEFFICIENT VALUES
 7 Claims, 5 Drawing Figs.

[52] U.S. Cl. ................................................. 340/172.5
[51] Int. Cl. ...................................................G01d 21/00,
 G06f 7/00
[50] Field of Search........................................... 340/172.5;
 235/150.1, 150.5, 150.53, 151.3, 151.31, 153

[56] References Cited
 UNITED STATES PATENTS
 3,278,770 10/1966 Shoh .............................. 235/150.1 X
 3,339,063 8/1967 Norsworthy................... 235/150.53 X
 3,526,756 9/1970 White............................ 235/151.3
 3,573,727 4/1971 Freeny .......................... 235/151.31 X OTHER REFERENCES
 Chow, Adaptive Pattern Recognition, IBM Tech. Disc. Bulletin Vol. 11, No. 11 April, 1969, p. 1,598.

*Primary Examiner*—Gareth D. Shaw
*Assistant Examiner*—R. F. Chapuran
*Attorneys*—Hanifin and Jancin and John J. Goodwin ABSTRACT: A method is provided for reducing measured data to representative coefficient values. The data relates to physical energy collected and measured by a physical sensor, and therefore, the measured data includes noise. In the method which may be carried out by programming a general purpose digital computer, the measured data values are first processed to remove the linear trend. The resultant values are then processed to provide the maximum number of coefficient values which represent the measured data values. A certain number of the set of coefficient values represent the portion of the measurements which is substantially noise, and may be eliminated. The method therefore includes a process for determining a number of coefficients of the total set which represent the measured data with minimum error where minimum error is defined as minimum stochastic uncertainty.

INVENTORS
JONATHAN B. DAVIS
NATHEN P. EDWARDS
HAROLD H. HERD

BY *John J. Goodwin*

ATTORNEY 3,626,384

METHOD FOR REPRESENTING MEASURED DATA VALUES BY COEFFICIENT VALUES

BACKGROUND OF THE INVENTION

The present invention utilizes mathematical techniques which are discussed as separate entities in prior art literature such as C. Lanczos, "Applied Analysis" Prentice-Hall Mathematical Series, May, 1961, Sir Ronald Fisher, "The Design of Experiments," Hafner Publishing Company, 1951 and Richard Von Mises, "Mathematical Theory of Probability and Statistics," Academic Press, 1964.

The present invention is distinct from the prior art in that a combination of steps are combined in a method not shown in the prior art for representing a set of measured data values by a number of coefficients with minimum error, that is, minimum stochastic uncertainty, wherein the method may be carried out by programming a general purpose digital computer.

SUMMARY

An object of the present invention is to provide a method for reducing a set of measured data values which contain components of noise to a lesser number set of coefficients which represent the physical variable from which the measured values were obtained with the components of noise substantially eliminated.

The foregoing and other objects, features, and advantages of the invention will be apparent from the following more particular description of preferred embodiments of the invention, as illustrated in the accompanying drawings.

Figure 1:
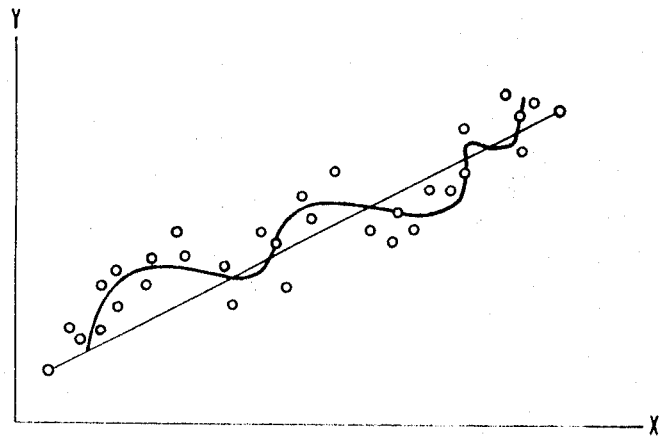
FIG. 1 is an illustration of a plot of measured data values including a linear trend.

All data relating to physical energy collected and measured by a physical sensor contains noise. This is true for two reasons. The first is that the sensor, regardless of its quality, introduces noise. Also, the output response of a sensor to discontinuities in a data function must be a continuous function since the sensor is a physical device and receives the data through a finite-sized receptor in a finite time. The other reason is that all physical energy detected by a sensor is stochastic since the energy reaches the sensor in increments (i.e., quanta).

Thus, in all physical measurements of energy through a sensor, there is a percentage of noise. For example, in plotting the characteristics of an alternating current motor as it is being brought up to speed, a plurality of data points are obtained from a sensor such as a meter. When the measured points are plotted on a coordinate system, the investigator finds that the points cannot be connected by a single continuous curve. The investigator therefore draws a continuous curve through the array of data points in a path representative of the overall trend of the array of points. The points which fall on the continuous curve are considered true data points and the points on either side of the continuous curve are considered as containing "noise." The distance of the points from either side of the continuous curve is a measure of the error deviation.

The measurements obtained through a sensor are not the most efficient and compact representation of the physical energy measured. In any handling of the measurements, for example storing, processing, transmitting, etc., it is more efficient to represent the physical variable from which the set of measurements were obtained by a set of coefficients which are fewer in number than the number of measurements. For example, consider a physical energy distribution function which is measured through a sensor and represented by 2,000 measured points. A Fourier transformation of the measured function will produce fundamental and harmonic coefficients which represent the deterministic (signal) portion of the function in generally much less than 2,000 parameters. Thus, it is preferable to process, store, transmit, etc., the coefficients derived from the measured function rather than the actual measured points.

When the coefficients of the measured data are obtained from the entire set of measurements, the coefficients will represent the actual data and the noise. Presume that a set of measurements consisting of 2,000 measured points are reduced and represented by 2,000 coefficients. The 2,000 coefficients represent both the actual data and the noise and a percentage of the coefficients mainly represent the noise. It is possible, therefore, that the function embodied by the 2,000 measured points can be as well represented by only 100 coefficients which substantially relate to the actual data and not the noise. Thus, in reducing measured data points to a lesser number of coefficients it is desirable to eliminate those coefficients which are representative substantially of noise. If not enough coefficients are eliminated or discarded, the reduction is not efficient; however, if too many coefficients are eliminated or discarded, coefficients representative of actual data are eliminated and an error will be introduced.

In the present invention, a method is provided wherein a set of measured values are reduced to a lesser set of coefficients which represent the physical variable from which the measured values were obtained with minimum error. More particularly, the set of N-measured values are reduced to the maximum number of coefficients N−1. The maximum number of coefficients are then processed to determine the number of coefficients which can be eliminated with minimum error. Having determined the number of coefficients which produce minimum error, all other sets of measured values of the same type as the initial set are reduced to that number of coefficients which produce minimum error. Alternatively, if the minimum error is found to be smaller than necessary for the purpose desired, the sensing system can be adjusted to measure fewer values or measure at a faster rate or with a larger sensor aperture.

The method of the present invention may be practiced on a general purpose digital computer or a special purpose computer may be constructed to carry out the method. The structure for carrying out the method presently exists in most general purpose digital computers, and the invention will be described herein such that one skilled in the art of programming a general purpose computer can practice the invention.

The present method initiates with a set of measured values of physical energy (i.e., a dependent physical variable) measured at equally spaced intervals of an independent physical variable. The physical energy may be radiant energy such as light. It may be hydraulic energy, acoustic energy, or any other physical energy capable of measurement through a sensor. The present method has utility in a wide range of technologies such as electron microscopy, character recognition and radio astronomy.

Presume that a set of measured values of a dependent physical variable have been collected by a sensor and have been digitized and stored in the computer memory in a conventional manner. The set of measured values consists of N discrete sample values of said physical variable measured at equally spaced intervals of an independent variable such as time, frequency, etc. The sample measured values are designated $Y_{(1)}, Y_{(2)}, Y_{(3)}...Y_{(N)}$. Any collection of data values made on equally spaced intervals may be represented by the expression $$Y_{(x)} = mx + b + \sum_{k=1}^{max} B_{(k)} \sin \pi k \frac{x}{L} \qquad (1)$$

where $L$ is the total measurement length, $x$ is the measurement abscissa and $(mx+b)$ is the linear trend. $B_k$ designates the coefficients which represent the N measured values.

When the linear trend of expression (1) is removed, the function satisfies the expression $$H_{(x)} = \sum_{k=1}^{max} B_{(k)} \sin \pi k \frac{x}{L} \qquad (2)$$

When expression (2) is taken in discrete intervals from 0 to $\pi$ expression (2) becomes $$H_{(j)} = \sum_{k=1}^{max} B_{(k)} \sin \pi k \frac{(j-1)}{(N-1)} \qquad (3)$$

As will be later described, the value of "MAX" is initially set at N−1. The coefficients are obtained by the expression $$B_{(k)} = \frac{2}{N-1} \sum_{j=1}^{N} H_{(j)} \sin \pi k \frac{(j-1)}{(N-1)} \qquad (4)$$

The described procedure will produce correct results if the most probable value of any measurement containing error is the average of many repetitions of the measurement. This is accomplished by taking the data in a way that ensures that the stochastic components of the measurements involved are stationary and ergodic. This means that the noise level does not change as a function of the independent variable or the amplitude of the measured data.

The method of the present invention will be more completely described with reference to the drawings. Referring to FIG. 1, a set of measured values $Y_{(1)}...Y_{(N)}$ is represented as a plurality of N discrete measured values plotted as points on a coordinate system having an abscissa $x$ and an ordinate $y$ whose significance depends on the type of measurements. They may represent amplitude versus distance, frequency versus time, etc. The set of measurements has a linear trend represented by the straight line and nonlinear components represented by the curved line. The straight line represents the $mx+b$ portion of expression (1).

Figure 3:
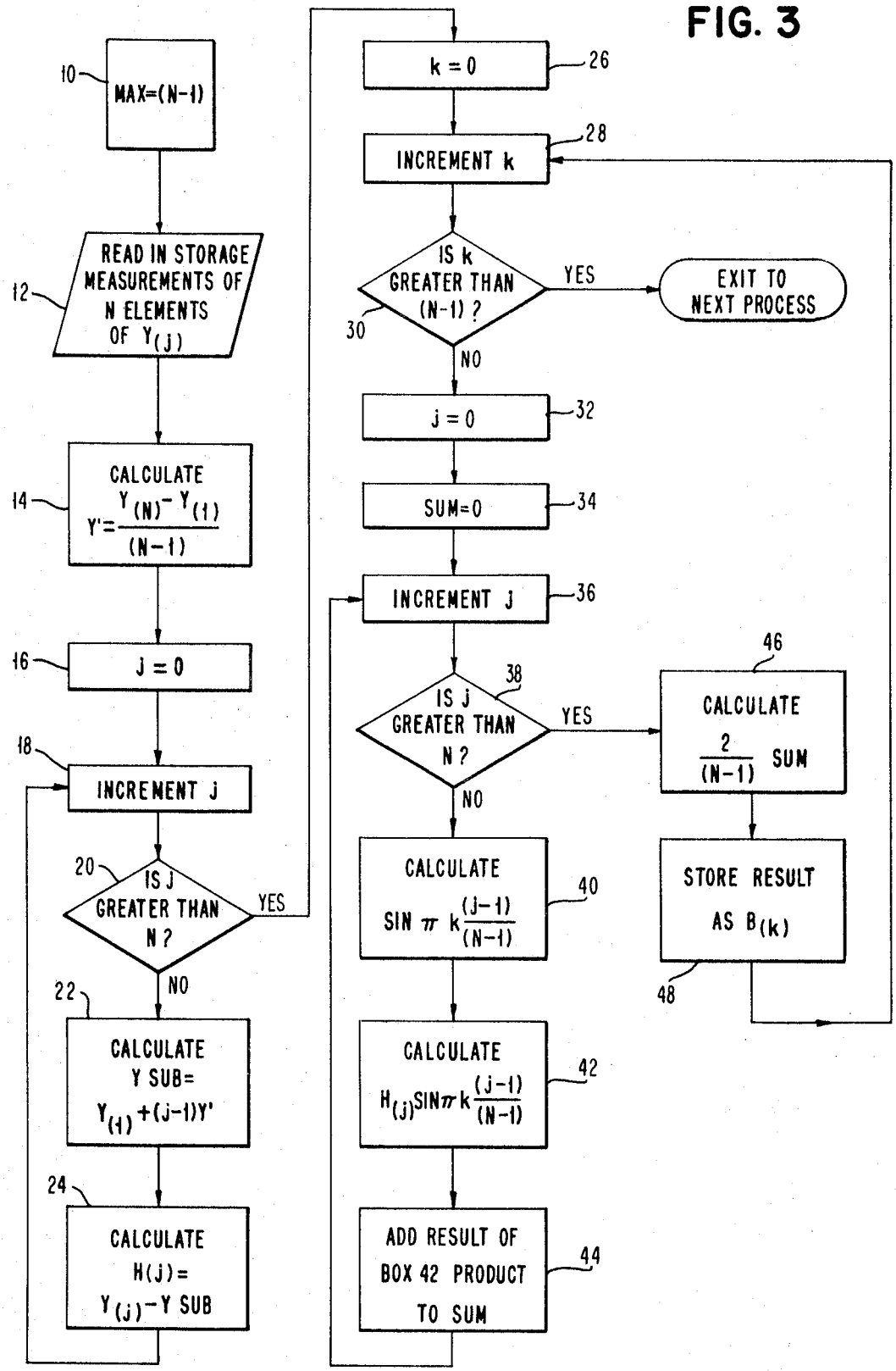
FIG. 3 is a flow diagram of a computer program for carrying out a portion of the method of the present invention on a digital computer.

After having obtained the measurement signal consisting of the N discrete sample values of the physical variable, the N discrete values are stored in computer memory and are indexed by index values in the order in which they were obtained by the sensor. The values are indexed in the memory by index values $(j=1)$, $(j=2)$, $(j=3)...(j=N)$ where $(j=1)$ is the index for $Y_{(1)}$, the first sample value measured and $(j=N)$ is the index for $Y_{(N)}$, the last sample value measured. The indexing step is required because the measured values are later processed in the order obtained. Referring to FIG. 3, blocks 10 and 12 of the flow chart represent the steps just described.

Next, the linear trend of the measurements is removed and a new set of N values are calculated which represent the set of measurements with the linear trend removed. The new set of N values, designated $H_{(1)}$, $H_{(2)}$, $H_{(3)}...H_{(N)}$ is graphically shown in FIG. 2. The linear trend is removed by first calculating the slope of the linear trend in the computer by subtracting the first measured value $Y_{(1)}$ from the last measured value $Y_{(N)}$ and dividing the difference by the value (N−1), the slope of the linear trend, designated $Y'$ is thus expressed $$Y' = \frac{Y_{(N)} - Y_{(1)}}{(N-1)} \qquad (5)$$

Having obtained the slope of the linear trend, the linear trend is removed from the set of measurements and a new set of N values $H_{(1)}$, $H_{(2)}$, $H_{(3)}H_{(N)}$ is obtained. The values $H_{(j)}$ are calculated by subtracting from each of said stored measured values $Y_{(j)}$ a quantity equal to the first measured value $Y_{(1)}$ plus the product of the linear trend $Y'$ and one less than the index $(j-1)$ of each sample value. Thus, $H_{(1)}$ is obtained by the expression $H_{(1)} = Y_{(1)} - [Y_{(1)} + (1-1)Y']$ $H_{(9)}$ is represented by the expression $H_{(9)} = Y_{(9)} - [Y_{(1)} + (9-1)Y']$ and finally $H_{(N)} = Y_{(N)} - [Y_{(1)} + (N-1)Y']$ In FIG. 3, box 14 represents the step of obtaining the slope of the linear trend. Boxes 16, 18, 20, 22 and 24 represent the steps performed in obtaining the calculated values $H_{(j)}$. In the step of box 16, the index $j$ is set to zero and in step 18, the index $j$ is incremented by one. Box 20 represents the step of testing to see if the index $j$ is greater than N. In the step of box 22, one less than the index is multiplied by the slope of the linear trend and added to the value $Y_{(1)}$. In the step of box 22, the value obtained in the step of box 22 is subtracted from $Y_{(j)}$ to obtain $H_{(j)}$. This sequence of steps is repeated until $H_{(N)}$ is obtained, at which point the step of box 22 indicates that $j$ exceeds N and that all the values $H_{(1)}...H_{(N)}$ have been calculated.

Figure 2:
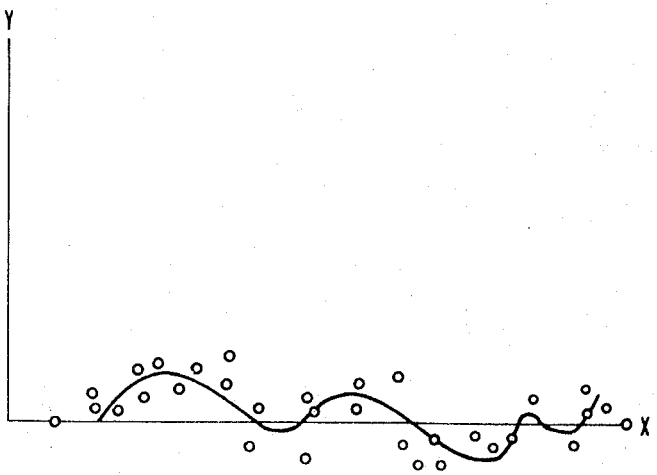
FIG. 2 is an illustration of the plot of the measured data values with the linear trend removed.

The N calculated values $H_{(1)}$ through $H_{(N)}$ represent the original set of measured values with the linear trend removed as depicted in FIG. 2. The next step in the method is the deriviation of the N−1 coefficients $B_{(1)}$ through $B_{(N-1)}$ by an orthogonal polynomial approximating function such as a sine Fourier transformation of the set of values $H_{(1)}$ through $H_{(N)}$. The relationship between the coefficients $B_{(k)}$ and the calculated values $H_{(j)}$ has been previously set forth in expression (4). To obtain the transformation, the following routine is performed by the computer:

Step 1—Form the product $$\pi k \frac{1}{(N-1)}$$

for $k$ equal to 1.

Step 2—Multiply the product of step 1 by $(j-1)$ for $j$ equal to 1.

Step 3—Calculate the trigonometric sine of the result of step 2.

Step 4—Multiply the result of step 3 by $H_{(j)}$ for $j$ equal to 1 and store the result.

Step 5—Repeat steps 2, 3 and 4 for $j$ equal to 2, 3, 4...N and accumulate the results for $j$=1 through N.

Step 6—Multiply the accumulated value of step 5 by 2/(N−1a) and store as $B_{(1)}$.

Step 7—Repeat steps 1 through 6 for $k$=2, 3, 4...(N−1) and store the results as $B_{(2)}$, $B_{(3)}$, $B_{(4)}...B_{(N-1)}$.

Referring to FIG. 3, the described routine is set forth in the flow chart as boxes 26, 28, 30, 32, 34, 36, 38, 40, 42, 44, 46 and 48. Boxes 26, 28, 32, and 36 increment the $k$ and $j$ values. Boxes 40, 42 and 44 calculate and sum for the values of $j$ up to the value N as determined at box 38 to provide $B_k$ and repeat the operation for the values of $k$ up to the value N−1 as determined by box 30 to provide all the N−1 coefficients $B_k$. The N−1 coefficients represent both the true data value and the values which contain the noise. The next steps in the method of the present invention is to eliminate or discard the proper number of coefficients, those coefficients which relate to the measured values containing noise. This means that the set of coefficients $B_{(1)}$ through $B_{(N-1)}$ will be truncated at a determined coefficient. Elimination of too few coefficients would be inefficient since more coefficients than are necessary to represent the set of measured values would be retained and elimination of too many coefficients would introduce error since too few coefficients are retained to accurately represent the set of measured values. Thus, the steps of the method to be described next serve to reduce the number of coefficients to those which represent the dependent variable from which the measured values were obtained with minimum error on a probabalistic basis.

It was previously shown that the coefficients $B_k$ were obtained by an orthogonal polynomial approximating function such as a sine Fourier transformation. A transform of this type converges with the result that in the series of coefficients $B_{(1)}$, $B_{(2)}, B_{(3)},...B_{(N-1)}$ the coefficients in the beginning of the series are representative of the data values and the coefficients at the end of series are representative of the noise. The portion of the method to be described provides a value MAX which represents a number of coefficients after which all the succeeding coefficients in the series are eliminated to provide a number of coefficients which represent the dependent physical variable with minimum error.

Figure 4:
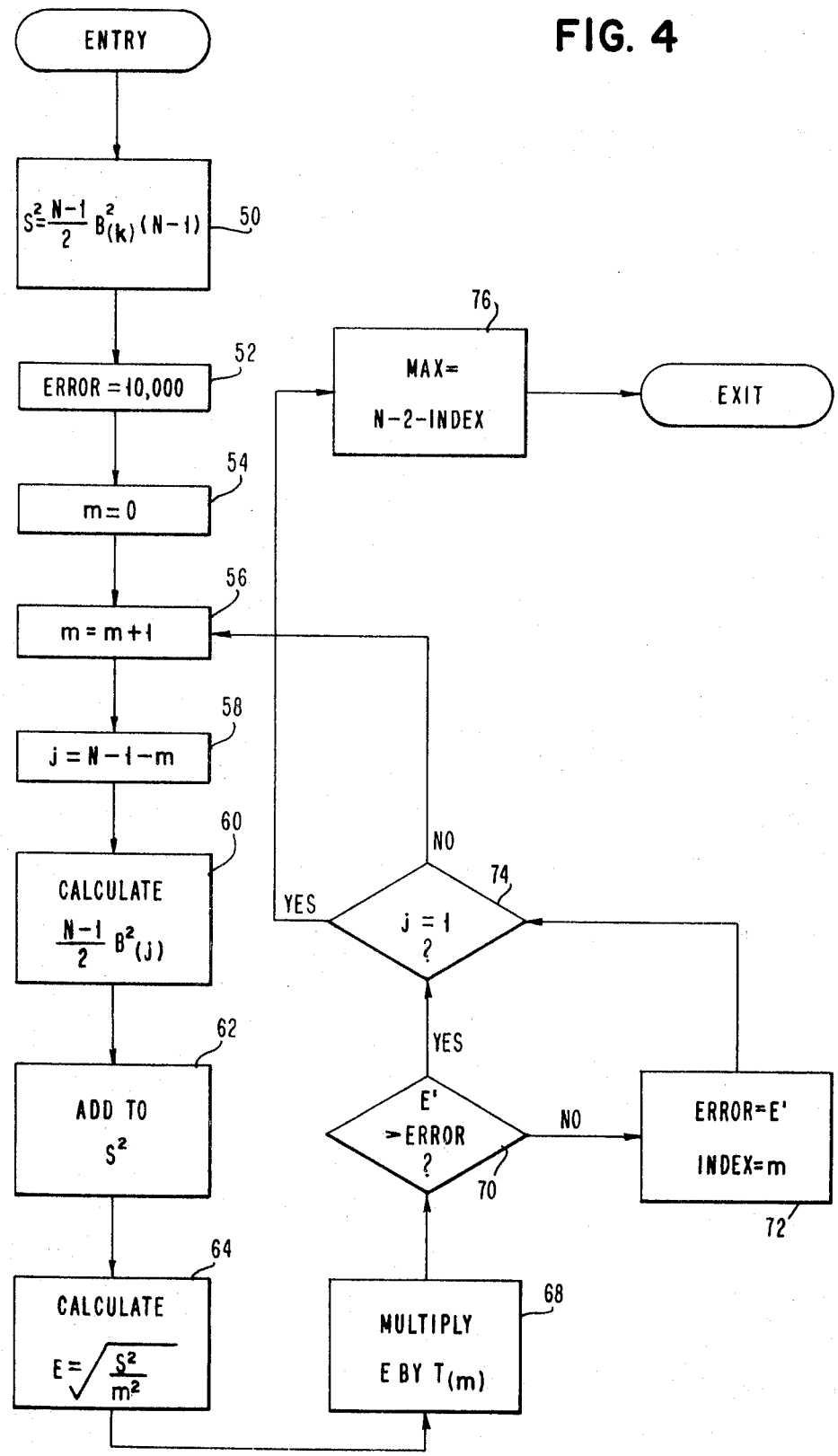
FIG. 4 is a flow diagram of a computer program for carrying out another portion of the present invention on a digital computer.

After the step of obtaining the coefficients $B_{(1)}$ through $B_{(N-1)}$ as shown in FIG. 3, a sum $S^2$ is calculated wherein $$S^2 = \frac{N-1}{2} B^2_{(N-1)}$$

as shown in box 50 of FIG. 4. A large error figure is established in box 52, for example, an error of 10,000 which is known to be larger than the error to be calculated. In box 54, the value of $m$ is set at zero; $m$ represents the degrees of freedom and is equal to the number of measured values minus the coefficients minus one constraint for the linear trend removed. In box 56, the value 1 is added to the previous value of $m$. Thus, in the routine $m$ starts with a zero value and then has the values 1, 2, 3....etc., in sequence.

In box 58 a value $j$ is calculated which is equal to $N-1$ minus the value $m$ from box 56. In box 60 the value $$\frac{N-1}{2} B^2_{(j)}$$

is calculated which is added to $S^2$ in the step represented by box 62. In box 64 the value $E$ is calculated and is represented by the value $$E = \sqrt{S^2/m^2}$$

In boxes 56 through 64 therefore the following takes place. The parameter $m$ is incremented to the value 1 and $S^2$ becomes $$\frac{N-1}{2} B^2_{(N-1)} + \frac{N-1}{2} B^2_{(N-2)}$$

This is the calculated value of box 60 added to the original value of $S^2$ from box 50. The new value of $S^2$ is then used in box 64 with $m=1$ to provide the value E.

The parameter $m$ then becomes 2 and $S^2$ becomes $$\frac{N-1}{2} B^2_{(N-1)} + \frac{N-1}{2} B^2_{(N-2)} + \frac{N-1}{2} B^2_{(N-3)}$$

This value of $S^2$ is then used in box 64 with $m=2$ to calculate the value $E$. Thus, it is seen that the routine continues and the value $E$ is calculated in box 64 as $m$ takes the values 3, 4, 5, etc., and $j$ takes the values $N-4$, $N-5$, $N-6$, etc.

Each time a value $E$ is calculated it is multiplied in box 68 by the parameter $T_{(m)}$ to produce an error value $E$. The parameter T has a new value for each value of $m$ and is referred to as the T-distribution or "Student" distribution. The calculation of the student distribution $T_{(m)}$ for each value of $m$ is well known in the literature and is discussed in "Mathematical Theory of Probability and Statistics" by Richard Von Mises, Academic Press 1964, pages 411 through 416. The Student distribution is a particular type of distribution function representative of a probability function and is available in table form in the aforesaid textbook. The values of the distribution $T_{(m)}$ are initially stored in the computer memory to be available for the step represented by box E.

After obtaining the first value of error E for $m=1$ the error value E is compared in box 70 with the initial error value set in box 52. Since the initial error value was purposely set at a value higher than expected, E will be smaller than the initial value. Since E is smaller, it is stored in the step of box 72 and the index value is set to the value of $m$ which in the initial try is 1. The initial value of error in box 52 is replace by E and if $j$ has not reached the value of 1 as determined in box 74 the steps represented by the boxes 56 through 70 are repeated for an $m$ of value "2" to produce a new error value E which is compared to the previous value of E (box 70). If the new value of E is smaller than the previous value of E the new value of E becomes the error and is stored with index of "2" in box 72 and becomes the new error value in box 52. If a newly calculated value E is larger than the previously calculated error stored in the step of box 72, then the routine goes directly from box 70 to box 74 and the smaller error value is maintained.

It can be seen from FIG. 4 that the routine represented by boxes 56 through 74 continues until $j$ is equal to 1 (which in turn means from observing box 58 that $m$ is equal to $N-2$). At the end of the routine, the smallest value of error E is identified by its index number as a result of the step represented by box 72. Thus the value MAX, that is the number of coefficients which represent the measured data values with minimum error is the value $N-2$ minus the index of the minimum error as depicted in box 76.

The result of the steps of the method represented in FIG. 4 is the determination of the subtotal number of coefficients of the total number of coefficients $B_{(1)}$, $B_{(2)},...B_{(N-1)}$ which can represent the N measured data values where minimum error is provided. The subtotal number is $N-2-$index where the index value is calculated in the program steps represented in FIG. 4.

The information derived from the present method may be utilized in a number of ways depending on the character and objectives of the measurement system. If the set of measured values N were the only measurements taken and no further measurements of the same type will be taken, then the selected ones of the $N-1$ coefficients serve to represent the measured values and may be processed, transmitted and otherwise handled more cheaply and efficiently than using either the N measured values themselves or the total $N-1$ coefficients.

If further sets of measure values of the same type exist, the further sets of measured data values may be reduced by the steps depicted in FIG. 3 with the exception that MAX is set at $N-2-$index in box 10, and the process terminates when $k$ is greater than $N-2-$index in box 30 rather than $N-1$. Thus, for succeeding sets of measurements of the type where the minimum error is presumed the same, the steps of the method set forth in FIG. 3 calculates the number of coefficients for minimum error rather than all $N-1$ coefficients, and there is no need to exit to the process set forth in FIG. 4.

It may be found that the minimum error calculated in the method steps set forth in FIG. 4 is much less than that required in the measurement process. For example, the minimum error may be found to be 1 percent whereas due to other system factors, the measurement system operates with a 5 percent error. In such a case, the error of the measurements is lower than necessary, and the system may be modified for future measurements such that fewer measured values are obtained, for example, by increasing the measurement rate or by making the data gathering aperture of the sensing means larger. What has been described is a method for processing measured data values of a physical variable obtained through a sensor. The measured values are digitized and stored in the memory element of a general purpose digital computer. The steps of the method are carried out by providing program instructions to the computer in a manner described and set forth in the program flow diagrams which can be understood by one skilled in the programming art. The instructions can be represented in most machine code languages such as Fortran and APL.

Figure 5:
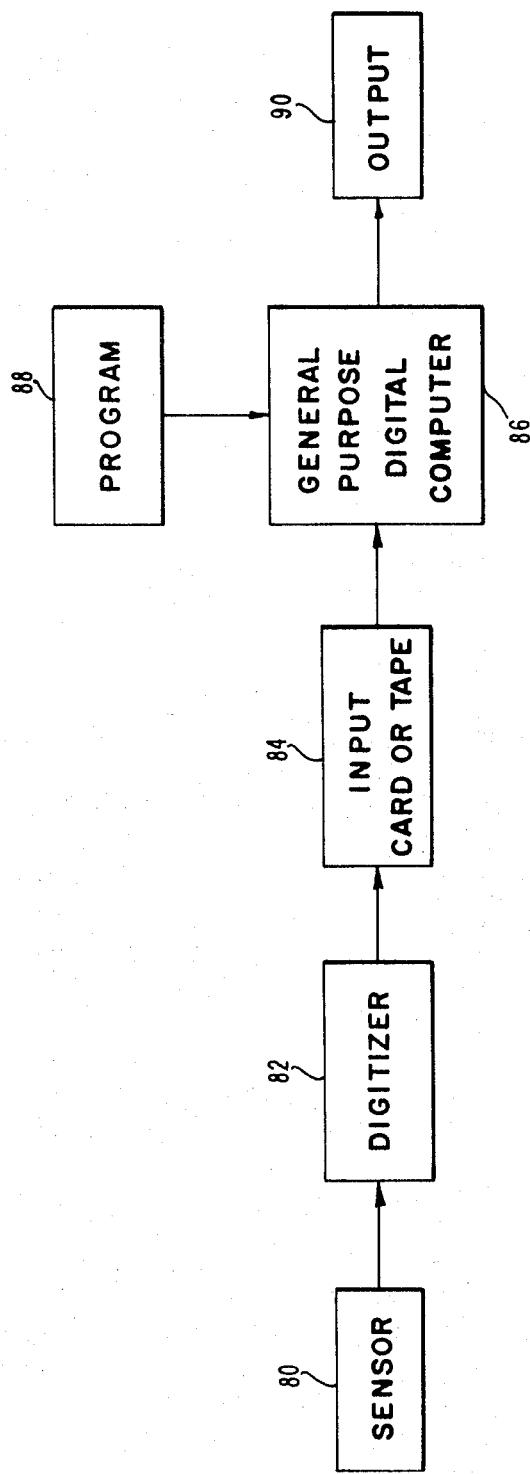
FIG. 5 is a schematic block diagram of a system for carrying out the method of the present invention.

Referring to FIG. 5, a schematic block diagram of a system for carrying out the method of the present invention is shown. The measurements are performed by sensor 80 and the measured values are digitized by digitizer 82 which may be an analog-to-digital converter. The digital values are entered into a general purpose digital computer 86 through the input means 84. The computer 86 is controlled by the program unit 88 which includes the described program and the resultant coefficients are obtained at output means 90 which may he a printer. Some examples of general purpose computers capable of carrying out the present invention are the IBM 1620 MOD1 and MOD2, the IBM 360, the IBM 7094, the IBM 1130, the IBM 1800, the PDP 8 and the UNIVAC 7000.

If desired, a special purpose digital computer could be designed and constructed to also carry out the method steps of the present invention.

While the invention has been particularly shown and described with reference to preferred embodiments thereof, it will be understood by those skilled in the art that various changes in form and details may be made therein without departing from the spirit and scope of the invention.

What is claimed is:

1. A method of representing by coefficients a physical variable from which measured data values were obtained where said data is obtained by a series of measurements of a dependent physical variable at equally spaced intervals of an independent variable with a sensor to produce a set of measured values of said physical variable designated $Y_{(1)}, Y_{(2)}, Y_{(3)},...Y_{(N)}$, and wherein said set of N measured values includes nonlinear components, and linear components referred to as the linear trend, comprising the steps of:

Step 1—storing said N discrete measured values in the memory unit of a computer, said measured values being indexed in the order obtained by said sensor by the index values one through N.

Step 2—programming the computer to calculate the incremental slope of the linear trend of said set of N measured values, said incremental slope being designated $Y'$.

Step 3—programming the computer to calculate a new set of N values designated $H_{(1)}$ calculated values being representative of said set of N measured values with the linear trend removed.

Step 4—and programming the computer to calculate an orthogonal polynomial approximating function of said new set of N values of step 3 to produce a number of coefficients equal to N minus 2 minus index (N−2−index) which are representative of said physical variable, said coefficients being designated $B_{(1)}, B_{(2)}, B_{(3)},...B_{(N-2-index)}$ where N−2−index is the number of coefficients which represent the N measured values with minimum error.

2. A method of representing by coefficients a physical variable from which measured data values were obtained where said data is obtained by a series of measurements of a dependent physical variable at equally spaced intervals of an independent variable with a sensor to produce a set of N discrete measured values of said physical variable designated $Y_{(1)}, Y_{(2)}, Y_{(3)},...Y_{(N)}$ and wherein said set of N measured values includes nonlinear components, and linear components referred to as the linear trend, comprising the steps of:

Step 1—storing said N discrete measured values in the memory unit of a computer, said measured values being indexed in the order obtained by said sensor by index values designated $(j=1), (j=2), (j=3)....(j=N)$, where $(j=1)$ is the index of the first measured value $Y_{(1)}$ and $(j=N)$ is the index for the last measured value $Y_{(N)}$.

Step 2—programming the computer to calculate the difference between the first and last measured values $(Y_{(N)}-Y_1)$ and dividing the difference by the value $(N-1)$ to provide the incremental slope $Y'$ of the linear trend of the set of N measured values.

Step 3—programming the computer to calculate a new set of N values by subtracting from each one of said N stored measured values a quantity equal to the first measured value $Y_1$ plus the product of the slope $Y'$ and one less than the index of each measured value wherein said new set of calculated values is designated $H_{(1)}, H$ Step 4—and programming the computer to calculate the sine Fourier transform of said new set of N values of step 3 to produce a number of harmonic coefficients equal to N−2−index which are representative of said N measured values, said harmonic coefficients being designated $B_{(1)}, B_{(2)}, B_{(3)},...B_{(N-2-index)}$ where N−2−index is the number of coefficients which represent the physical variable with minimum error.

3. A method according to claim 2 wherein said step 4 of programming the computer to calculate the sine Fourier transform of said set of N values $H_{(1)}$ through $H_{(N)}$ includes the steps for calculating tee coefficients $B_{(1)}$ through $B_{(n-2-index)}$ according to the relationship $$B_{(k)} = \frac{2}{(N-1)} \sum_{j=1}^{N} H_{(j)} \sin \pi k \frac{(j-1)}{(N-1)}$$

as follows:

Step 4–1 calculate the product $$\pi k \frac{1}{(N-1)}$$

where $k$ is equal to 1.

Step 4–2 for $j=1$ calculate the product of step 4–1 by $(j-1)$.

Step 4–3 calculate the trigonometric sine of the result of step 4–2.

Step 4–4 multiply the result of step 4–3 by $H_{(j)}$ for $j$ equal to 1.

Step 4–5 repeat steps 4–2, 4–3 and 4–4 for values of $j$ equal to 2 through N and accumulate all the resultant values.

Step 4–6 multiply the accumulated value of step 4–5 by the value 2/(N−1) and store as $B_{(1)}$.

Step 4–7 repeat steps 4–1 through 4–6 for values of $k$ equal to 2 through $(n-2-\text{index})$ and store as $B_{(2)}$ through $B_{(n-2-\text{index})}$.

4. A method of representing by coefficients a physical variable from which measured data values were obtained where said data is obtained by a series of measurements of a dependent physical variable at equally spaced intervals of an independent variable with a sensor to produce a set of N discrete measured values of said physical variable designated $Y_{(1)}, Y_{(2)}, Y_{(3)},...Y_{(N)}$, and wherein said set of N measured values includes nonlinear components, and linear components referred to as the linear trend comprising the steps of:

Step 1—storing said N discrete measured values in the memory unit of a computer, said measured values being indexed in the order obtained by said sensor by index value designated $(j=1), (j=2), (j=3)....(j=N)$ where $(j=1)$ is the index of the first measured value $Y_{(1)}$ and $(j=N)$ is the index for the last measured value $Y_{(N)}$.

Step 2—programming the computer to calculate the incremental slope $Y'$ of the linear trend of the set of N measured values.

Step 3—programming the computer to calculate a new set of N values designated $H_{(1)}, H_{(2)}, H_{(3)},...H_{(N)}$, said set of N calculated values being representative of said set of N measured values with the linear trend removed.

Step 4—programming the computer to calculate an orthogonal polynomial approximating function of said new set of N values of step 3 to produce a number of coefficients equal to N−1 which are representative of said set of N measured values, said coefficients being designated $B_{(1)}, B_{(2)}, B_{(3)},...B_{(N-1)}$.

Step 5—programming the computer to calculate for each coefficient $B_{(1)}$ through $B_{(N-1)}$ the standard error of estimate of means uncertainty and to store the index number of the coefficient producing the minimum value of error.

Step 6—programming the computer to calculate the number N−2 minus the index number obtained in step 5 and to provide the coefficients $B_{(1)}$ through $B_{(N-2-index)}$, said coefficients representing the physical variable with minimum error.

5. A method according to claim 4 wherein said step 4 of programming the computer to calculate an orthogonal polynomial approximating function of said set of N values $H_{(1)}$ through $H_{(N)}$ includes the steps for calculating by a sine Fourier transform the coefficients $B_{(1)}$ through $B_{(N-2-index)}$ according to the relationship $$B_{(k)} = \frac{2}{(N-1)} \sum_{j=1}^{N} H_{(j)} \sin \pi k \frac{(j-1)}{(N-1)}$$

as follows:

Step 4–1 calculate the product $$\pi k \frac{1}{(N-1)}$$

where $k$ is equal to 1.

Step 4–2 for $j=1$ calculate the product of step 4–1 by $(j-1)$.

Step 4–3 calculate the trigonometric sine of the result of step 4–2.

Step 4–4 multiply the result of step 4–3 by $H_{(j)}$ for $j$ equal to 1.

Step 4–5 repeat steps 4–2, 4–3 and 4–4 for values of $j$ equal to 2 through N and accumulate all the resultant values.

Step 4–6 multiply the accumulated value of step 4–5 by the value $2/(N-1)$ and store as $B_{(1)}$.

Step 4–7 repeat steps 4–1 through 4–6 for values of $k$ equal to 2 through (N–2–index) and store as $B_{(2)}$ through $B_{(N-2-index)}$.

6. A method according to claim 4 wherein step 5 of programming the computer to calculate the standard error of estimate of mean uncertainty for the coefficients $B_{(1)}$ through $B_{(N-1)}$ includes the steps as follows:

Step 5–1 storing an index $m$ of value of one and program the computer to calculate and store an error value $E'$ where $E'$ is a function of $B_{(N-1)}$ and a distribution value $T_{(m)}$.

Step 5–2 programming the computer to increment the index value $m$ by one and calculate a new error value $E'$ as a function of $B_{(N-2)}$ and $T_{(m)}$ and comparing the new error value with the previous error value and storing the lesser error value and the value of $m$ associated with the lesser error value.

Step 5–3 programming the computer to separately calculate in sequence new error values as a function of each of the coefficients $B_{(N-3)}$ through $B_{(1)}$ and $T_{(m)}$ where $m$ is incremented by one for each calculation and comparing each new error value with the previously calculated error value and storing the lesser error value and the index value $m$ associated with the lesser error value.

Step 5–4 programming the computer to calculate the value MAX equal to N minus 2 minus index where index is the value finally stored in step 5–3.

7. A method according to claim 4 wherein step 5 of programming the computer to calculate the standard error of estimate of mean uncertainty for each coefficient $B_{(1)}$ through $B_{(N-1)}$ includes the steps as follows:

Step 5–1 storing in the computer memory an initial value of error.

Step 5–2 programming the computer to calculate an initial value $S^2$ which is a function of $B^2_{(N-1)}$.

Step 5–3 programming the computer to calculate a value which is a function of $B^2_{(N-2)}$ and adding the value to the value of $S^2$ to form a new value $S^2$.

Step 5–4 programming the computer to calculate the value $E$ equal to $\sqrt{S^2/m^2}$ where $S^2$ is obtained in step 5–3 and $m$ is the degree of freedom for the coefficient $B_{(N-2)}$.

Step 5—5 programming the computer to multiply 5–value $E$ of step 5–4 by a distribution value $T_{(m)}$ to produce an error value $E'$.

Step 5–6 programming the computer to compare the error value $E'$ of step 5–5 with the initial stored error value of step 1 and storing the lesser value.

Step 5–7 programming the computer to repeat steps 5–3, 5–4, 5–5 and 5–6 for the coefficient $B_{(N-3)}$ through $B_{(1)}$ to obtain and store the minimum error value $E'$ and the index of the coefficient for which the minimum value of $E'$ was calculated.

Step 5–8 programming the computer to calculate the value MAX equal to N minus 2 minus index where index is the value finally stored in step 5–7.

* * * * *